(12) United States Patent
Lalancette et al.

(10) Patent No.: US 10,424,905 B2
(45) Date of Patent: Sep. 24, 2019

(54) SHALLOW OCTAGONAL ELECTRICAL BOX

(71) Applicant: Thomas & Betts International LLC, Wilmington, DE (US)

(72) Inventors: Daniel Lalancette, St-Jean-sur-Richelieu (CA); Marc-Antoine Veillette, Ange-Gardien (CA)

(73) Assignee: Thomas & Betts International LLC, Wilmington, DE (US)

( * ) Notice: Subject to any disclaimer, the term of this patent is extended or adjusted under 35 U.S.C. 154(b) by 249 days.

(21) Appl. No.: 15/171,319

(22) Filed: Jun. 2, 2016

(65) Prior Publication Data

US 2016/0365711 A1 Dec. 15, 2016

Related U.S. Application Data

(60) Provisional application No. 62/173,696, filed on Jun. 10, 2015.

(51) Int. Cl.
*H02G 3/08* (2006.01)
*H02G 3/12* (2006.01)
*H02G 3/18* (2006.01)

(52) U.S. Cl.
CPC ............ *H02G 3/081* (2013.01); *H02G 3/083* (2013.01); *H02G 3/088* (2013.01); *H02G 3/12* (2013.01); *H02G 3/123* (2013.01)

(58) Field of Classification Search
CPC ........ H02G 3/081; H02G 3/088; H02G 3/083; H02G 3/152; H02G 3/123

USPC .......................................... 220/3.8, 3.5, 3.3
See application file for complete search history.

(56) References Cited

U.S. PATENT DOCUMENTS

| | | |
|---|---|---|
| 2,581,755 A * | 1/1952 | Dieffenderfer ......... H02G 3/123 220/3.6 |
| 4,880,128 A | 11/1989 | Jorgensen |
| 5,234,119 A | 8/1993 | Jorgensen et al. |
| 5,407,088 A | 4/1995 | Jorgensen et al. |
| 5,600,093 A * | 2/1997 | Herth .................... H02G 3/123 174/53 |
| 5,939,671 A | 8/1999 | Gretz |
| 6,107,568 A | 8/2000 | Schnell et al. |
| 6,191,362 B1 | 2/2001 | Gretz |
| 6,239,365 B1 | 5/2001 | McEvers |
| 6,355,883 B1 | 3/2002 | Gretz |
| 6,677,523 B1 | 1/2004 | Gretz |

(Continued)

*Primary Examiner* — J. Gregory Pickett
*Assistant Examiner* — Niki M Eloshway
(74) *Attorney, Agent, or Firm* — Taft Stettinius & Hollister LLP; J. Bruce Schelkopf

(57) ABSTRACT

A shallow octagonal electrical box having a back wall and a stepped sidewall construction. The back wall includes at least first and second substantially flat sections connected by an intermediate section. The sidewall extends from the back wall to an open front and has an octagonal shape formed by eight sidewall sections. At least three contiguous sidewall sections have a first height and at least three of the other sidewall sections have a second height that is different from the first. At least one sidewall section has an opening or aperture adapted to provide a passage into the interior. The sidewall can have a hub or connector attached to the exterior surface around the opening/aperture. The sidewall can also have a knockout and a plurality of mounting apertures.

16 Claims, 7 Drawing Sheets

(56) References Cited

U.S. PATENT DOCUMENTS

| | | | |
|---|---|---|---|
| 6,827,229 B2 | 12/2004 | Dinh et al. | |
| 6,908,003 B2 | 6/2005 | Feyes et al. | |
| D556,144 S | 11/2007 | Dinh | |
| 7,361,833 B2 | 4/2008 | Dinh | |
| 7,531,744 B1 | 5/2009 | Rohmer | |
| 8,193,444 B2 | 6/2012 | Rodenberg | |
| 8,344,248 B2 | 1/2013 | Lalancette et al. | |
| D677,634 S | 3/2013 | Korez et al. | |
| 9,237,665 B1 * | 1/2016 | Baldwin | H05K 5/0217 |
| 2005/0183873 A1 * | 8/2005 | Gottardo | H01R 13/74 |
| | | | 174/50 |
| 2010/0067176 A1 * | 3/2010 | Garavuso | H02G 3/123 |
| | | | 361/679.01 |
| 2011/0083871 A1 * | 4/2011 | Lalancette | H02G 3/123 |
| | | | 174/50 |
| 2011/0240363 A1 * | 10/2011 | Dinh | H02G 3/088 |
| | | | 174/551 |
| 2013/0153265 A1 * | 6/2013 | Chen | H02G 15/007 |
| | | | 174/153 G |
| 2015/0219856 A1 * | 8/2015 | Wang | G02B 6/4416 |
| | | | 385/53 |
| 2016/0025253 A1 * | 1/2016 | Crompton | F16L 37/086 |
| | | | 285/194 |
| 2017/0040787 A1 * | 2/2017 | Liberatore | H02G 3/081 |
| 2017/0186577 A1 * | 6/2017 | Haines | H01H 47/22 |

* cited by examiner

SHALLOW OCTAGONAL ELECTRICAL BOX

This application claims priority from provisional application Ser. No. 62/173,696, filed on Jun. 10, 2015, which is incorporated herein in its entirety.

FIELD OF THE INVENTION

The present invention is an electrical box having an octagonal shape. In particular, the present invention relates to a shallow octagonal electrical box with a stepped back wall construction.

BACKGROUND OF THE INVENTION

Electrical boxes are used for mounting and connecting a variety of different electrical devices, as well as for connecting wires and cables. The size and shape of the electrical box used are typically determined by the specific application and the location of the installation. Octagonal shaped electrical boxes with four flat sides and four curved sides are commonly used because the four flat sides of the box allow for different orientations. These octagonal shaped electrical boxes are often installed over a vapor barrier membrane, especially for new construction applications. Care must be taken not to damage the integrity of the membrane and, if it is damaged, it must be repaired. This can add to the cost and the time needed to complete a project. FIG. 1 shows a typical roof construction, beginning with a drywall panel that forms the interior ceiling and then successive layers of wood furring, vapor barrier membrane, horizontal trusses, insulation, sloped trusses, plywood roof, roof protective membrane and roof shingles. In energy efficient homes, a vapor barrier membrane (e.g., a polyethylene membrane), is installed between the truss and the wood furring.

There are many ways to install an octagonal electrical box in a ceiling. The most common is to install the box between two wood furring strips and fastened in place with three or four screws. The end-user typically adds a second layer of vapor barrier membrane behind the box to ensure that screws passing through the membrane do not compromise the vapor barrier. The installation becomes more difficult when the structure is formed by pieces of wood that are arranged in a stepped back manner and the octagonal electrical box cannot be easily attached to one of the pieces of wood.

A second method of installing an octagonal box is to install a piece of wood (generally a 2"×4" piece) between two trusses and securing the octagonal box to it. This piece of wood has to be positioned above the trusses so that the back wall of the box can be affixed to the piece of wood and the front of the box is flush with the finished ceiling. Another way to install an octagonal electrical box is the most time consuming method. The user cuts the membrane and then seals the vapor barrier booth and the membrane with acoustical sealant and tape. After that, the electrician can run the cables to the box and fasten the box on the truss through the vapor barrier booth. If the seal is not perfect, the barrier will not function properly and the installation will become energy inefficient.

Accordingly, there is a need for an electrical box that can be easily mounted to a truss or a support covered by a vapor barrier membrane without puncturing the membrane and compromising the vapor barrier seal.

SUMMARY OF THE INVENTION

In accordance with the present invention, a shallow octagonal electrical box with a stepped construction is provided. The shallow octagonal electrical outlet box comprises, consists of or consists essentially of a back wall with an intermediate section and a sidewall. The back wall includes a perimetrical edge and first and second substantially flat sections. The first and second substantially flat sections have first and second interior surfaces, wherein the first interior surface is parallel to and offset from the second interior surface. The intermediate section adjoins and connects the first and second substantially flat sections and has a first intermediate interior surface. Preferably, the second interior surface adjoins the first intermediate interior surface at a 90-degree, 120-degree, 135-degree or 150-degree angle and the first intermediate interior surface adjoins the first interior surface at a 210-degree, 225-degree, 240-degree or 270-degree angle. The back wall can also include a ground connection.

The sidewall extends from the back wall to a distal rim that defines an open front. Preferably, the distal rim of the sidewall is parallel to the first and second interior surfaces. The sidewall has an octagonal shape and is formed by at least eight sidewall sections that have a width and a height and define an interior. At least three contiguous sidewall sections are connected to the first substantially flat section and these sidewall sections have a first height and at least three sidewall sections are connected to the second substantially flat section and these sidewall sections have a second height that is greater than the first height. At least one sidewall section of the sidewall has an opening adapted to provide a passage into the interior. The sidewall has an exterior surface and a hub can be attached to the exterior surface around the opening. At least one sidewall section can have a removable disc that can be removed to provide access to the interior and the sidewall can also have a plurality of mounting apertures for attaching the box to a stud or other mounting surface. Preferably, at least one sidewall section has an embossment with two openings that are adapted to receive two snap-in connectors.

The shallow octagonal electrical outlet box can also include a cover plate having a perimetrical edge that contacts the distal rim of the sidewall. The shallow octagonal electrical outlet box can have at least five contiguous sidewall sections that are connected to the first substantially flat section or to the second substantially flat section. The shallow octagonal electrical outlet box can have a back wall that includes a third substantially flat section with a third interior surface and a second intermediate section with a second intermediate interior surface. The second intermediate section connects the second substantially flat section with the third substantially flat section. Preferably, the third interior surface adjoins the second intermediate interior surface and the second interior surface adjoins the first intermediate interior surface at a 90-degree, 120-degree, 135-degree or 150-degree angle; and the second intermediate interior surface adjoins the second interior section and the first intermediate interior surface adjoins the first interior surface at a 210-degree, 225-degree, 240-degree or 270-degree angle. In a most preferred embodiment, the third interior surface adjoins the second intermediate interior surface and the second interior surface adjoins the first intermediate interior surface at a 90-degree, angle; and the second intermediate interior surface adjoins the second interior section and the first intermediate interior surface adjoins the first interior surface at a 270-degree angle.

BRIEF DESCRIPTION OF THE FIGURES

The preferred embodiments of the octagonal electrical box of the present invention, as well as other objects, features and advantages of this invention, will be apparent from the accompanying drawings wherein.

DETAILED DESCRIPTION OF THE INVENTION

Figure 1:
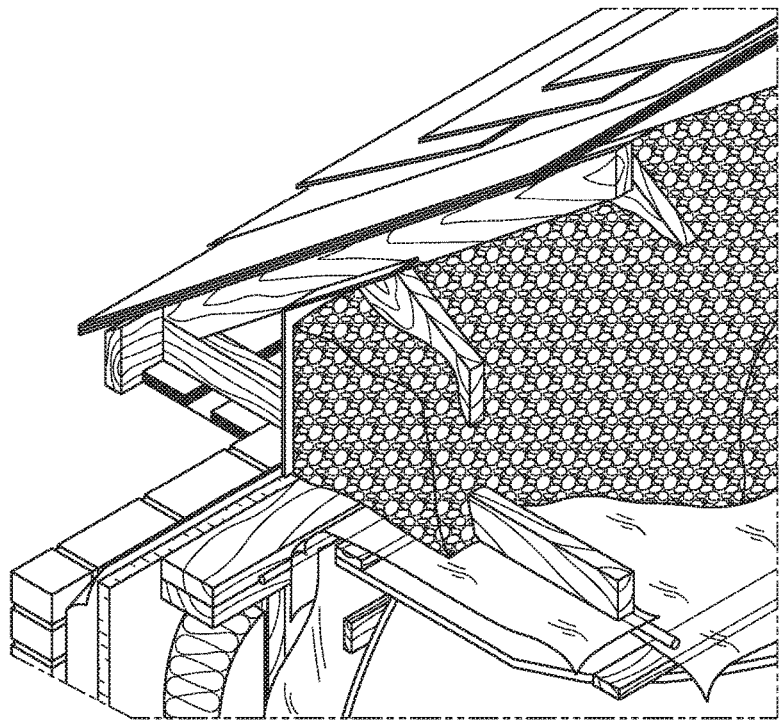
FIG. 1 is a sectional view showing a typical prior art roof construction.

The present invention is an octagonal electrical box with a stepped back wall construction that provides a shallow interior for a portion of the box. The purpose of this design is to provide an octagonal electrical box that can be easily attached to studs and other structures to reduce the installation time for the end-user. The bottom of the box has two or more sections that are substantially flat without any protrusions to avoid puncturing the vapor barrier membrane so that the box can be installed directly on a truss or other structure. Preferably, the octagonal box has a metallic drawn construction and has a bottom (also referred to herein as "back wall") with multiple steps (see FIG. 2). However, the octagonal electrical box can be formed by other methods using other materials, e.g., an extruded plastic construction. The depth of the different steps allows different finishing combinations: (1) wood furring+½" drywall (see FIG. 3); (2) steel furring channel+½" drywall; (3) wood furring+2× ⅝" drywall (see FIG. 4); (4) wood furring+¾" soundproofing panel+½" drywall and others.

As used herein, the term "vapor barrier" refers to a continuous sheet of moisture impermeable plastic that prevents moisture from passing through and causing mold and rot on interior walls. The plastic sheet can be made continuous by taping or using an adhesive to attach two or more sheets together. In order to be effective, the barrier must be continuous and any breach will reduce the effectiveness of the barrier.

As used herein, the terms "hub," "connector" and "coupling" are used to describe types of devices designed to transition from a rigid or flexible conduit system or for the direct connection of wires or cables into an enclosure. One-piece devices are typically bolted to the top of an enclosure. Alternatively, a two-piece hub, connector or coupling may be used and typically includes one piece that is designed to be inserted into a knockout in the enclosure from the outside, with the other piece inserted from inside the enclosure, and with the two pieces then connected together. Typically, the two parts are screwed or fastened together, enabling the conduit to be connected to the enclosure. For some applications, a bushing can also be used, either alone or in combination with a hub, connector or coupling.

As used herein, the term "stepped back wall construction" refers to a setback or a step-like recession in a wall. For example, where two pieces of wood are attached to each other and the side of one of the pieces of wood extends beyond the side of the other piece of wood.

The octagonal electrical outlet box includes a back wall and a sidewall. The back wall includes a perimetrical edge and at least first and second substantially flat sections that are offset and connected by at least one intermediate section. The sidewall extends from the back wall to a distal rim that defines an open front. The sidewall has an octagonal shape and is formed by eight sidewall sections that define an interior. At least three contiguous sidewall sections have a first height and at least three of the other sidewall sections have a second height that is different from the first.

At least one sidewall section has an opening or aperture adapted to provide a passage into the interior and a hub or connector can be attached to the exterior surface around the opening/aperture. At least one sidewall has a knockout formed by a removable disc that can be removed to provide access to the interior. The sidewall can also have a plurality of mounting apertures.

The octagonal electrical box can have a variety of embodiments that are formed by using alternates constructions: (1) the height of the box and the height of the steps can vary to allow different combinations of wall finishing layers; (2) the box can have more than two steps to allow more combinations with the same box; (3) the material and the steel thickness can be different; (4) the box can be fabricated with separate components instead of one drawn part; (5) the box can have a variety of different knockout configurations; and (6) the type and quantity of connectors provided with the box can be different.

Figure 2:
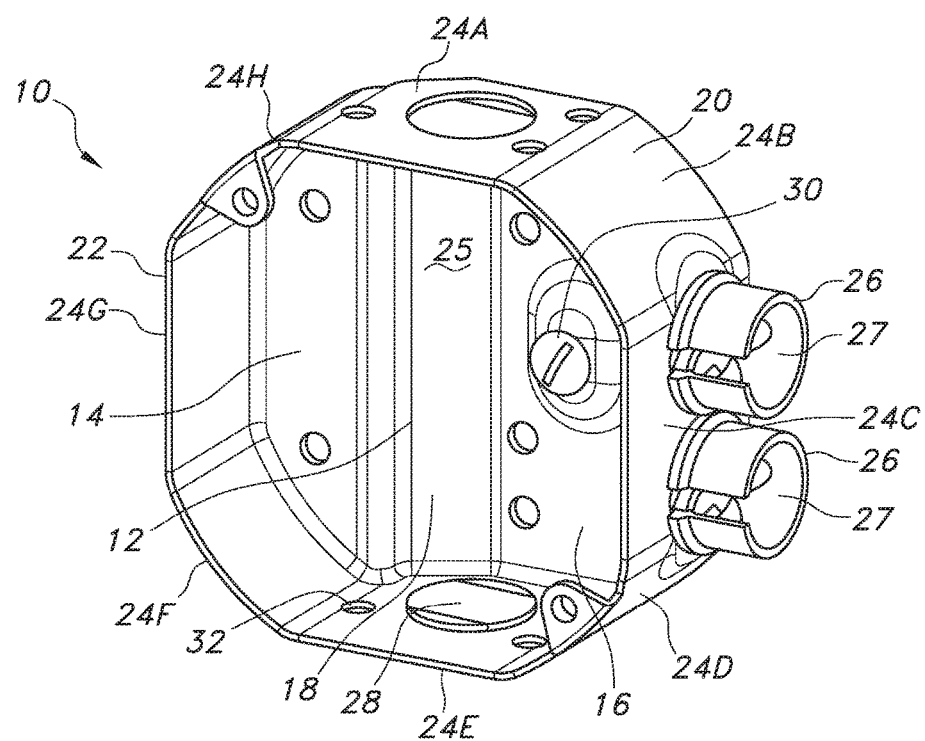
FIG. 2 shows a first embodiment of the octagonal electrical box of the present invention.

One embodiment of the octagonal electrical box of the present invention is shown in FIGS. 2-8. FIG. 2 shows an octagonal electrical box 10 having a back wall 12 formed by a first back wall section 14, a second back wall section 16 and an intermediate back wall section 18. A sidewall 20 extends upwardly from the perimeter of the back wall 12 to a rim 22 that defines an open front face 23 of the electrical box 10. The sidewall 20 is formed by eight (8) adjoining sidewall sections 24A-H that define the interior 25 of the box 10. Fittings 26 can be attached to the sidewall sections 24A, C, E to connect conduits or cables (not shown) and provide access to the interior 25 through the apertures 27. The sidewall sections 24A-H can also have knockouts 28 that can be removed to form an aperture 29 that provides access to the interior 25. The back wall 12 of the box 10 can have a grounding connection 30. The sidewall sections 24A-H and back wall 12 of the box 10 can also have one or more mounting apertures 32 for attaching the box 10 to a structure.

As shown in FIG. 2, the first section 14 of the back wall 12 of the box 10 adjoins sidewall sections 24F-H and these sidewall sections have a first height (i.e., the first distance between first section 14 of the back wall 12 and the rim 22). The second section 16 of the back wall 12 of the box 10 adjoins sidewall sections 24B-D and these sidewall sections have a second height that is greater than the first height. The intermediate back wall section 18 adjoins sidewall sections 24A and E and extends between the first and second back wall sections 14, 16. The heights of sidewall sections 24A and E decreases as they transition between the first and second back wall sections 14, 16. There is also an edge, perpendicular to the wall sections 14 and 16 that provide an alignment of the box 10 during the installation. This small section is located between the section 14 and 18.

Figure 3:
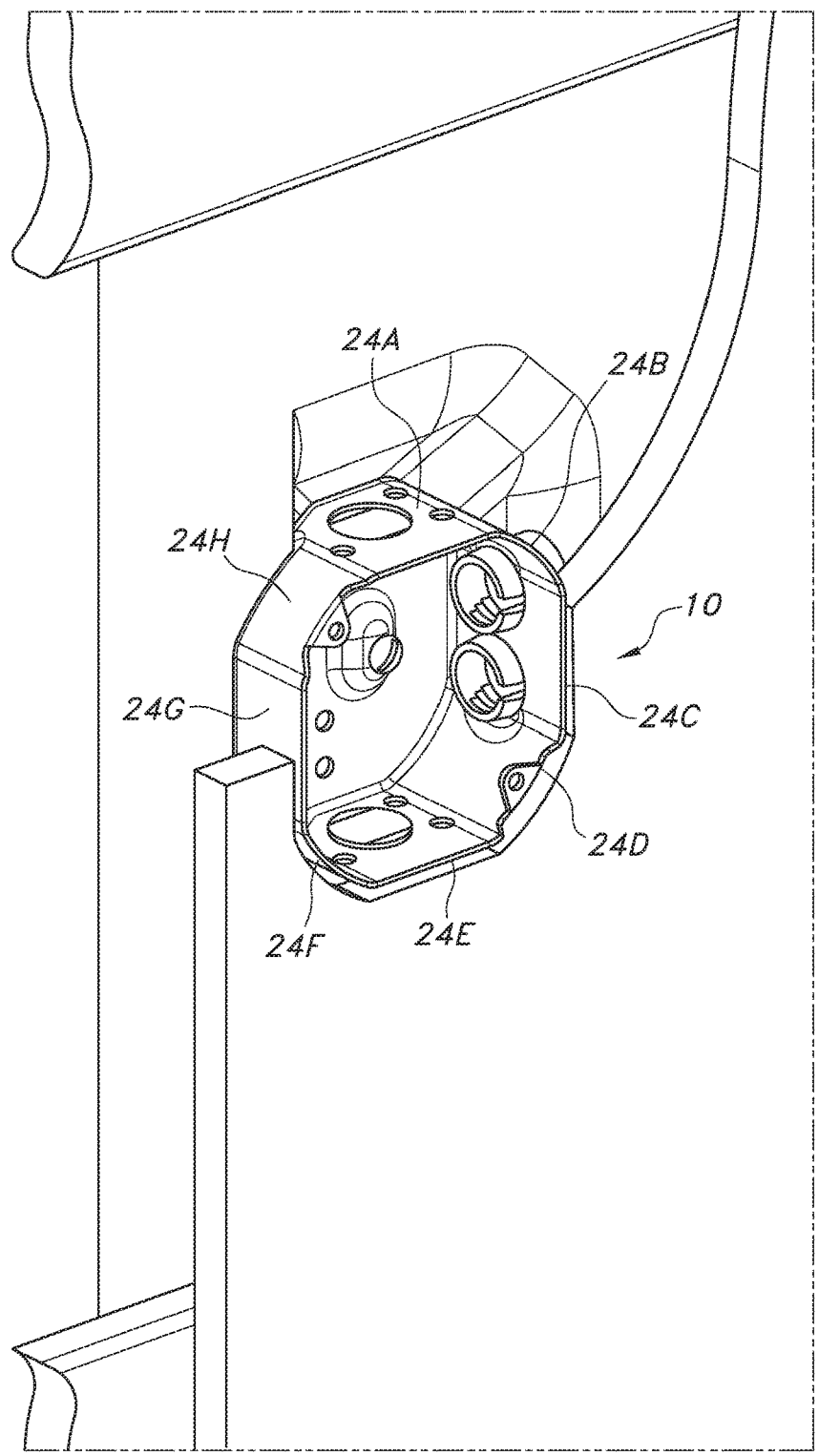
FIG. 3 shows an embodiment of the octagonal electrical box of the present invention designed for use with ½" drywall.
Figure 4:
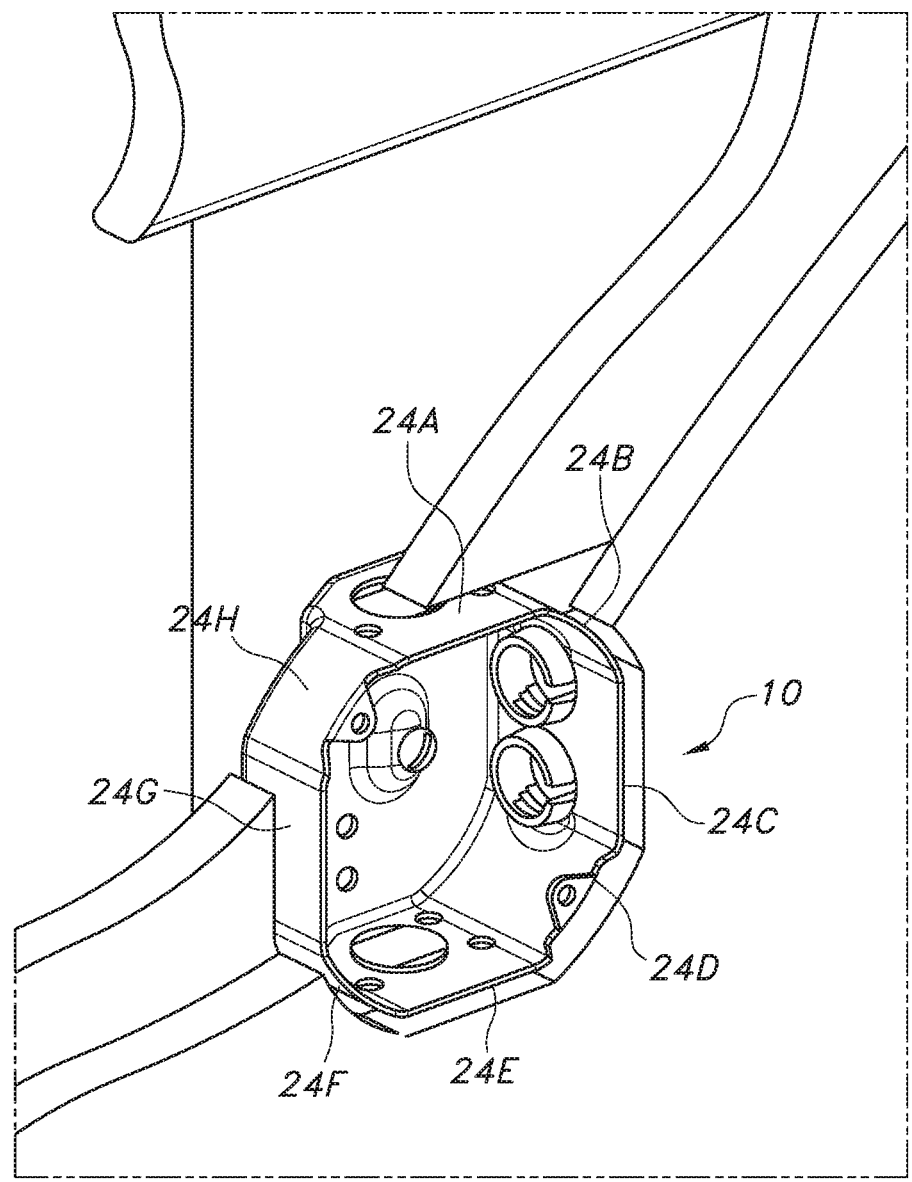
FIG. 4 shows an embodiment of the octagonal electrical box of the present invention designed for use with wood furring and 2×⅝" drywall.
Figure 5:
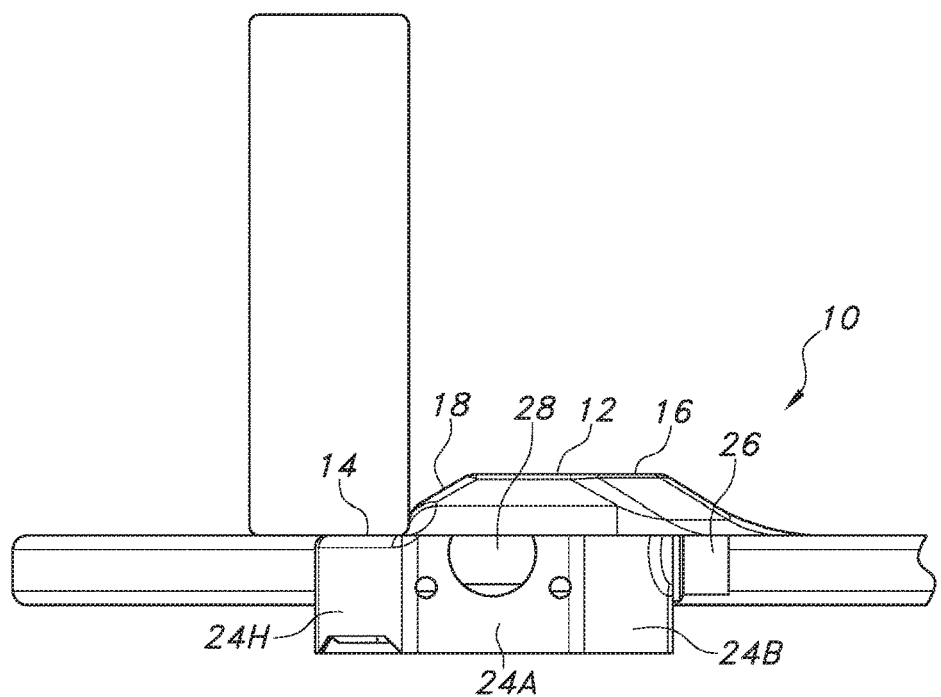
FIG. 5 is a top view of the embodiment of the octagonal electrical box shown in FIG. 3.
Figure 6:
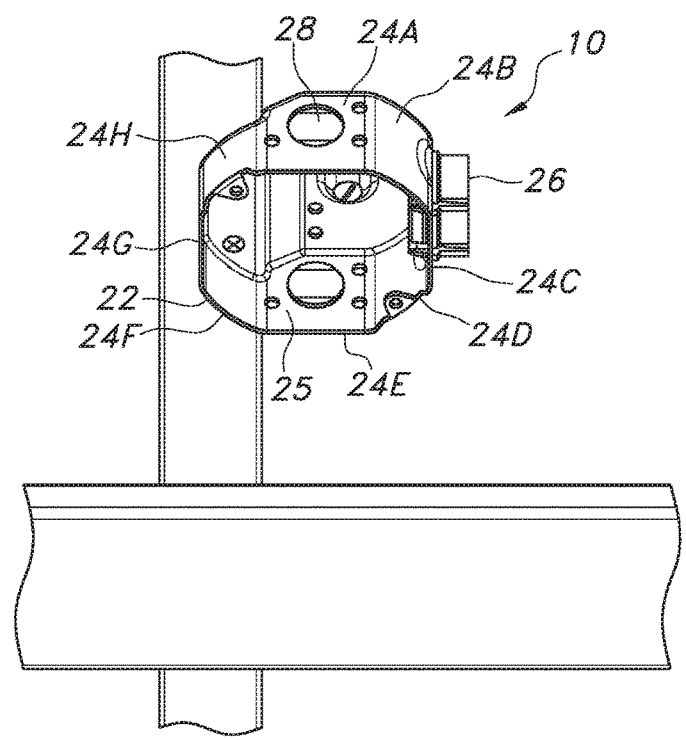
FIG. 6 is a peripheral side view of the embodiment of the octagonal electrical box shown in FIG. 3.
Figure 7:
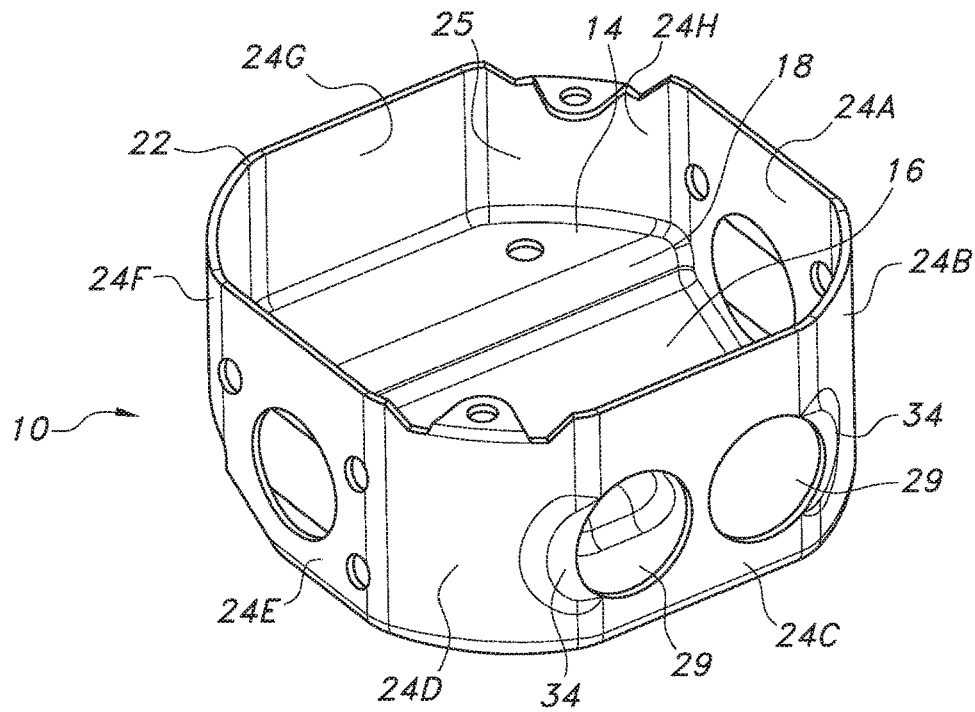
FIG. 7 is an exterior view of one of the sidewall sections of the octagonal electrical box with apertures for access to the interior.
Figure 8:
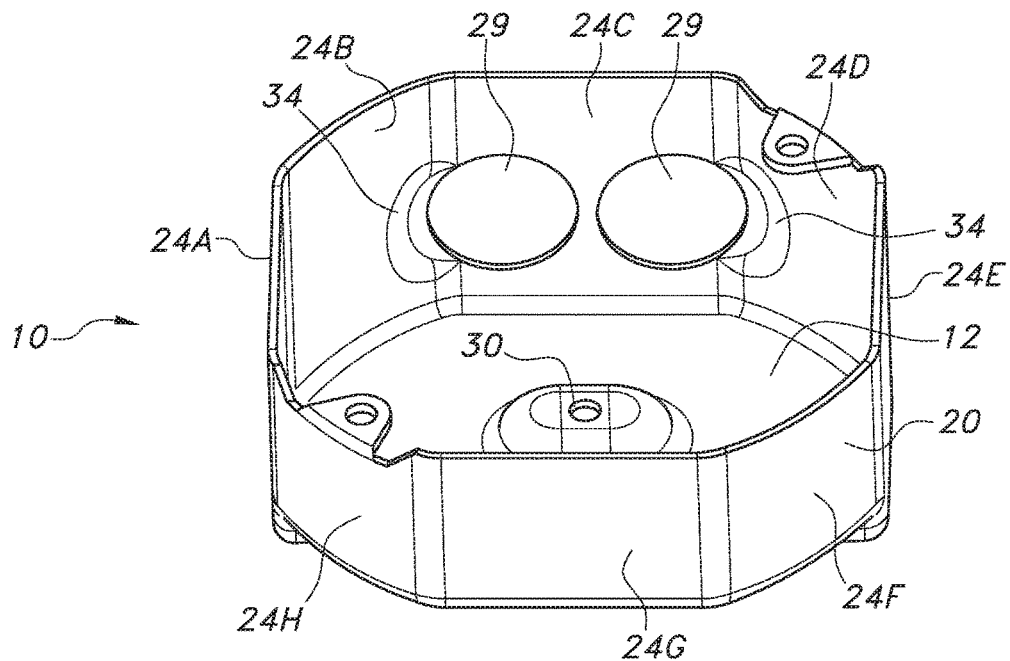
FIG. 8 is a top peripheral view of an embodiment of the octagonal electrical box of the present invention.

FIGS. 3 and 4 show an octagonal electrical box 10 installed in wood furring+½" and 2×⅝" drywall, respectively. FIGS. 5 and 6 show top and peripheral views of an electrical box 10 with sidewall section 24B having a height greater than sidewall section 24H. The three sections 14, 16, 18 of the back wall 12 are shown with intermediate section 18 sloping to connect the first and second back wall sections 14, 16. The exterior surface of the back wall 12 of the box 10 is smooth to prevent puncturing the vapor barrier membrane. The steps (i.e., back wall sections 14, 16, 18) on the box 10 push gradually on the membrane (see FIGS. 5 and 6). FIG. 7 shows a sidewall section 24C with two apertures 29 for accessing the interior 25 of the box 10. FIG. 8 shows the interior 25 of the box 10 with a grounding connection 30 in the second back wall section 16. The ground screw is raised by the embossment to be sure that the screw will not break the vapor barrier. There are two embossments 34 on one sidewall section 24C of the box 10 that provide a flat surface for assembling two plastic connectors in the apertures 29 on the sidewall section 24C (see FIGS. 7 and 8).

Figure 9:
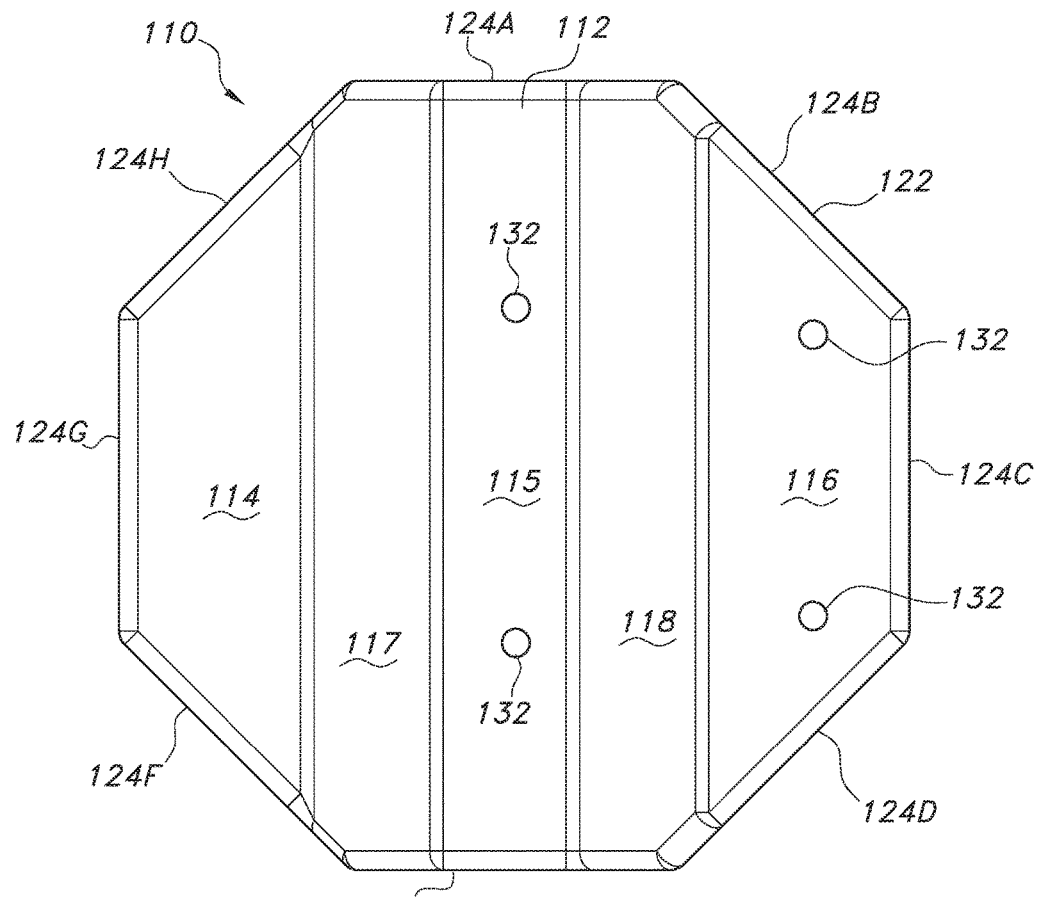
FIG. 9 is top view of an embodiment of the octagonal electrical box with a back wall having three substantially flat sections.
Figure 10:
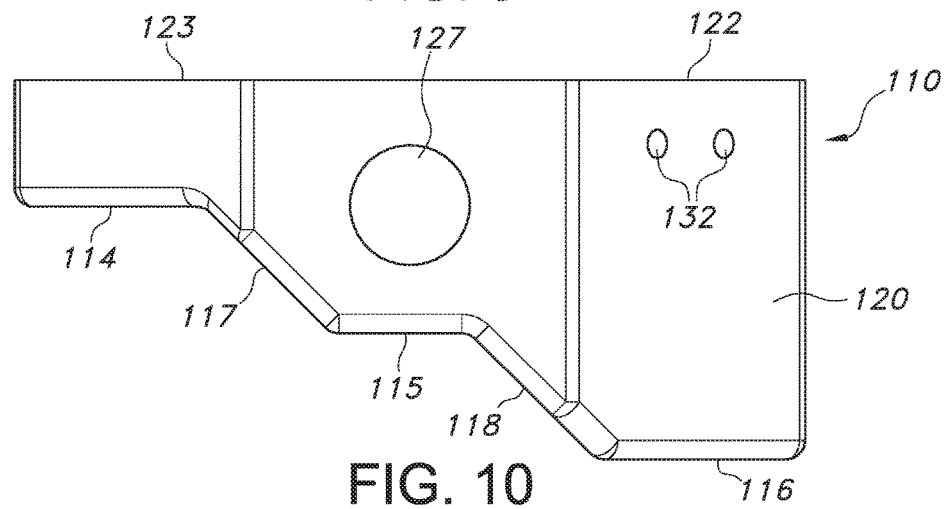
FIG. 10 is a side view of the embodiment of the octagonal electrical box shown in FIG. 9.

FIGS. 9 and 10 show another embodiment of the octagonal electrical box 110 having a back wall 112 formed by a first back wall section 114, a second back wall section 115, a third back wall section 116, a first intermediate back wall section 117 and a second intermediate back wall section 118. A sidewall 120 extends upwardly from the perimeter of the back wall 112 to a rim 122 that defines an open front face 123 of the electrical box 110. The sidewall 120 is formed by eight (8) adjoining sidewall sections 124A-H that define the interior of the box 110. The construction of the octagonal electrical box 110 is similar to the electrical box 10 shown in FIG. 2 with apertures 127 in the sidewall 120 passing wires or cables into the box 110 and mounting apertures 132 for attaching the box 110 to a structure. The difference between the electrical box 110 in FIG. 9 and the box 10 in FIG. 2 is the construction of the back wall 112, which has a third back wall section 116 and a second intermediate section 118.

Figure 11:
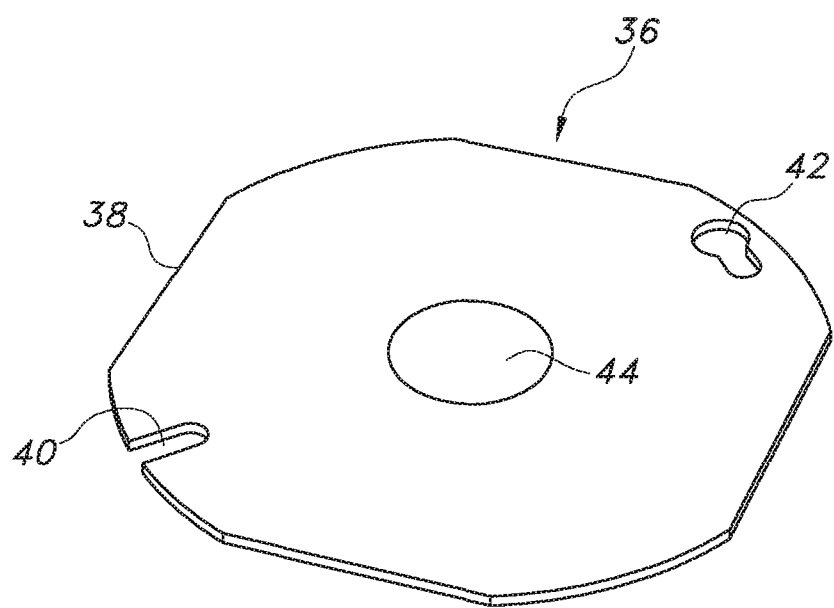
FIG. 11 is a top peripheral view of a cover that can be used with the various embodiments of the octagonal electrical box of the present invention.

FIG. 11 is a side view of the electrical box 110 and shows how the first back wall section 114 is connected to the second back wall section 115 by the first intermediate section 117 and the second back wall section 115 is connected to the third back wall section 116 by the second intermediate section 118. The back wall sections 114, 115, 116 can be connected to the intermediate sections 117, 118 of the back wall 112 at a variety of different angles. FIG. 10 shows the back wall sections 114-118 connected at 45-degree and 135-degree angles. However, the back wall sections 114-118 can be connected at different angles to satisfy different applications.

FIG. 11 shows a cover 36 for the octagonal electrical boxes 10, 110 of the present invention. The cover 36 has a perimetrical edge 38 that contacts the distal rim 22, 122 of the electrical box 10, 110. The cover 36 can also have a slot 40 and a keyed aperture 42 for attaching the cover 36 to the box 10, 110. In addition, a knock-out disc 44 in the center of the cover 36 can be used to provide access to the interior of the box 10, 110.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A shallow octagonal electrical outlet box comprising:
   a back wall comprising a perimetrical edge and first and second substantially flat sections, wherein the first and second substantially flat sections have first and second interior surfaces, and wherein the first interior surface is parallel to and offset from the second interior surface;
   an intermediate section adjoining and connecting the first and second substantially flat sections and having a first intermediate interior surface, the first intermediate section comprising a sloped portion that is sloped upwardly toward the first substantially flat section; and
   a sidewall extending from the back wall to a distal rim that defines an open front, wherein the sidewall has an octagonal shape and is formed by at least eight sidewall sections that have a width and a height and define an interior, and wherein at least three contiguous sidewall sections that comprise a first set of sidewalls are connected to the first substantially flat section and at least three sidewall sections that comprise a second set of sidewalls are connected to the second substantially flat section, and wherein a height of two sidewall sections gradually decreases along the sloped portion of the first intermediate section,
   wherein the first set of sidewalls extend at a first height from an adjacent portion of the distal rim to the first substantially flat section, and the second set of sidewalls extend at a second height from another adjacent portion of the distal rim to the second substantially flat section, the second height being greater than the first height, and wherein the adjacent portion of the distal rim from which the first set of sidewalls extend is co-planar with the other adjacent portion of the distal rim from which the second set of sidewalls extend.

2. The shallow octagonal electrical outlet box according to claim 1, wherein at least one sidewall section has an opening adapted to provide a passage into the interior.

3. The shallow octagonal electrical outlet box according to claim 2, wherein the sidewall has an exterior surface and a hub is attached to the exterior surface around the opening.

4. The shallow octagonal electrical outlet box according to claim 1, wherein at least one sidewall section has a removable disc that can be removed to provide access to the interior.

5. The shallow octagonal electrical outlet box according to claim 1, wherein the sidewall has a plurality of mounting apertures.

6. The shallow octagonal electrical outlet box according to claim 1, wherein at least one sidewall section has an embossment with two openings that are adapted to receive two snap-in connectors.

7. The shallow octagonal electrical outlet box according to claim 1 further comprising a flat cover plate having a perimetrical edge that contacts the distal rim of the sidewall.

8. The shallow octagonal electrical outlet box according to claim 1, wherein the distal rim of the sidewall is parallel to the first and second interior surfaces.

9. The shallow octagonal electrical outlet box according to claim 1, wherein the second interior surface adjoins the first intermediate interior surface at a 90-degree, 120-degree, 135-degree or 150-degree angle.

10. The shallow octagonal electrical outlet box according to claim 1, wherein at least five contiguous sidewall sections are connected to the first substantially flat section.

11. The shallow octagonal electrical outlet box according to claim 1, wherein at least five contiguous sidewall sections are connected to the second substantially flat section.

12. The shallow octagonal electrical outlet box according to claim 1, wherein the back wall further comprises a ground connection.

13. The shallow octagonal electrical outlet box according to claim 1, wherein the sloped portion of the intermediate portion is connected to an edge, the edge being positioned between, and perpendicular to, the first and second substantially flat sections.

14. A shallow octagonal electrical outlet box comprising:
a back wall comprising a perimetrical edge and first and second substantially flat sections, wherein the first and second substantially flat sections have first and second interior surfaces, and wherein the first interior surface is parallel to and offset from the second interior surface;
an intermediate section adjoining and connecting the first and second substantially flat sections and having a first intermediate interior surface; and
a sidewall extending from the back wall to a distal rim that defines an open front, wherein the sidewall has an octagonal shape and is formed by at least eight sidewall sections that have a width and a height and define an interior, and wherein at least three contiguous sidewall sections that comprise a first set of sidewalls are connected to the first substantially flat section and at least three sidewall sections that comprise a second set of sidewalls are connected to the second substantially flat section,
wherein the first set of sidewalls extend at a first height from an adjacent portion of the distal rim to the first substantially flat section, and the second set of sidewalls extend at a second height from another adjacent portion of the distal rim to the second substantially flat section, the second height being greater than the first height, and wherein the adjacent portion of the distal rim from which the first set of sidewalls extend is co-planar with the other adjacent portion of the distal rim from which the second set of sidewalls extend
wherein the back wall further comprises a third substantially flat section with a third interior surface and a second intermediate section with a second intermediate interior surface.

15. The shallow octagonal electrical outlet box according to claim 14, wherein the second intermediate section connects the second substantially flat section with the third substantially flat section.

16. The shallow octagonal electrical outlet box according to claim 14, wherein the third interior surface adjoins the second intermediate interior surface at a 90-degree, 120-degree, 135-degree or 150-degree angle.

* * * * *